2,758,134
Patented Aug. 7, 1956

2,758,134

ISOMERIZATION OF MALEIC ACID TO FUMARIC ACID IN THE PRESENCE OF GASEOUS CHLORINE

Elmer H. Dobratz, Clayton, Mo., assignor to Monsanto Chemical Company, St. Louis, Mo., a corporation of Delaware No Drawing. Application December 29, 1951, Serial No. 264,239

14 Claims. (Cl. 260—537)

This invention relates to improvements in the catalytic isomerization of maleic acid to fumaric acid, and more particularly, to improvements in the methods of producing fumaric acid from liquors containing maleic acid.

Fumaric acid is generally commercially produced by subjecting an aqueous solution of maleic acid to a catalytic isomerization operation and the present invention embodies the discovery that the quality of the fumaric acid product from processes using certain known isomerization catalysts may be substantially improved if free chlorine is present in the reaction mixture during the catalytic isomerization of the maleic acid to fumaric acid, particularly where hydrochloric acid is used as the isomerization catalyst. Moreover, this invention makes it possible to obtain high quality fumaric acid using the various crude maleic liquors available from commercial maleic anhydride operations as the direct source of maleic acid for isomerization.

Maleic anhydride may be commercially produced by the catalytic oxidation of various hydrocarbons, however, benzene is a principal raw material, and the gases from the catalytic converters are scrubbed with water to form an aqueous maleic acid scrub liquor. Also in the manufacture of phthalic anhydride, such as by the controlled catalytic oxidation of naphthalene, a certain amount of maleic anhydride is formed as a co-product. The phthalic anhydride is condensed from the gas stream from the catalytic converters and the tail gases containing maleic anhydride are thereafter scrubbed with water to form a maleic acid scrub liquor. These crude maleic acid liquors are thereafter dehydrated to obtain crude maleic anhydride which is subjected to various purification steps, including fractionation, to obtain the purified maleic anhydride product. During the various steps in these dehydration operations, other aqueous liquors and condensates are formed containing crude maleic acid in various concentrations. Any of these crude liquors or condensates from such maleic acid processes may be used in the practice of my invention.

It is known that the isomerization of maleic acid to fumaric acid is accelerated by various inorganic catalysts such as iodine, bromine, hydrochloric acid, hydrobromic acid, sulfuric acid, potassium thiocyanate and sodium bromide. A commonly used catalyst, and a very effective catalyst, is hydrochloric acid and the isomerization is generally carried out by the heating of an aqueous solution of maleic acid containing the hydrochloric acid catalyst. As the isomerization progresses and fumaric acid is formed, the fumaric acid crystallizes out of the reaction mixture due to its low solubility in the reaction mixture, and the fumaric acid crystals are subsequently separated such as by filtration, or centrifuging.

To obtain a high quality fumaric acid, purified maleic anhydride can be added to water to form an aqueous solution of maleic acid. In this manner, a maleic acid solution of high purity is obtained, which can then be heated with hydrochloric acid, as a catalyst, to isomerize the maleic acid to fumaric acid. The isomerization of maleic acid which has been formed from purified maleic anhydride generally produces a very white fumaric acid upon isomerization.

In view of the fact that maleic acid is generally isomerized to fumaric acid in an aqueous reaction mixture, the various liquors and condensates containing crude maleic acid, such as are available from various operations in the production of maleic anhydride, as have been described above, appear to be excellent sources of aqueous maleic acid solutions for the manufacture of fumaric acid by subjecting these aqueous maleic acid liquors and condensates directly to a catalytic isomerization operation, with no other treatment of these crude maleic acid solutions than adjusting the maleic acid concentration to an optimum value for the catalytic isomerization. However, when fumaric acid is produced directly from such crude maleic acid solutions, the product fumaric acid is generally of poor quality, the color of such fumaric acid varying from a dirty gray to tan color, rather than the desired and required light colored or substantially white product.

Therefore, to obtain a high quality fumaric acid by the isomerization of maleic acid, various alternatives are available, such as to first subject the crude maleic acid solutions to elaborate purification methods to obtain a high quality maleic acid solution before isomerization, or to perform expensive and time-consuming purification operations on the off-quality fumaric acid in order to obtain a product of satisfactory or usable quality, or to dehydrate these crude maleic acid solutions and form maleic anhydride, purify the maleic anhydride, and reform a maleic acid solution from the purified maleic anhydride. Any of these three alternatives add excessively to the ultimate cost of the final fumaric acid product. The improvement of this invention makes it possible to obtain a high quality light colored to substantially white fumaric acid from most of the crude maleic acid solutions such as the maleic acid scrub liquors or maleic acid condensates of maleic anhydride processes without having to extensively purify the crude maleic acid solution or the final fumaric acid product. I have now discovered that I can substantially improve the quality of the fumaric acid produced by the direct isomerization of the maleic acid in a relatively impure solution with a conventional catalyst, particularly hydrochloric acid.

According to my invention, the maleic acid contained in the crude maleic acid solutions is directly isomerized to fumaric acid in the presence of free chlorine in addition to conventional isomerization catalysts, of which I prefer hydrogen chloride, and which is present, of course, in the aqueous reaction mixture as hydrochloric acid.

Maleic acid liquors such as the scrub liquors and condensates heretofore mentioned, generally contain about 20 to 45% maleic acid. I have found that in the practice of my invention, better results are obtained if these maleic acid liquors are first concentrated by distilling off the excess water until a concentrated liquor is obtained containing about 50 to 80% maleic acid, and preferably about 60 to 65% maleic acid.

In some cases, where the crude maleic acid solutions are unusually impure, the fumaric acid made from such maleic acid solutions may have a yellow coloration, even though free chlorine was present in the isomerization reaction mixture during the conversion of the maleic acid to fumaric acid. In such cases, I have found that the quality of the fumaric acid produced directly even from these usually impure maleic acid solutions, can be still further improved by also passing the free chlorine into the maleic acid solution during the concentration step of the maleic acid solution, as well as during the conversion step.

In the preferred practice of my invention, the concentrated liquor is heated to reflux temperature at atmospheric pressure and gaseous chlorine is bubbled into the liquor while concentrated hydrochloric acid is slowly added to the boiling liquor. Soon after the addition of the hydrochloric acid is begun, fumaric acid crystals begin to separate from the reaction mixture. The reaction is allowed to continue under gentle reflux for about two hours after the addition of the hydrochloric acid is completed, during which time free chlorine is continued to be passed into the reaction mixture. Generally, the flow of free chlorine into the reaction mixture is controlled so that the total quantity of chlorine passed into the reaction mixture during the isomerization step amounts to only about 1 to 2% of the weight of the maleic acid originally present. After the reflux period is completed, the chlorine flow is stopped and the reaction mixture is cooled to room temperature. The fumaric acid crystals are then recovered, preferably by filtration or centrifuging, washed with dilute hydrochloric acid and water and dried. The fumaric acid thus made is generally light colored to substantially white and is recovered in 85 to 95% yields based on the maleic acid content of the original liquors.

For optimum results with respect to rate of reaction, quality and yields of fumaric acid, I prefer to adjust the concentration of the maleic acid solutions so that after the addition of the hydrogen chloride is completed, the isomerization reaction mixture should contain, for each mole of maleic acid originally present about 2 to 6 moles of water, and for each mole of water, the reaction mixture should contain about 0.05 to 0.08 mole of hydrogen chloride. Depending upon convenience, the hydrogen chloride may be added to the reaction mixture in the form of hydrogen chloride gas or in the form of hydrochloric acid, however, when hydrochloric acid is added to the reaction mixture, the water present in the hydrochloric acid must be taken into account so that the reaction mixture, after the addition of the hydrochloric acid, will contain the maleic acid, water and hydrogen chloride within the ranges herein set out.

Due to the fact that fumaric acid has a very low solubility in the acidic aqueous isomerization reaction mixture, the fumaric acid separates from the reaction mixture in the form of fine crystals almost as quickly as the fumaric acid is formed, thereby the reaction mixture ultimately becomes a heavy slurry containing crystalline fumaric acid. The proportions of maleic acid, hydrogen chloride and water as above indicated provides a maximum conversion of the maleic acid to fumaric acid and an easily handled slurry from which yields up to 95% of high quality fumaric acid can be obtained, based on the maleic acid originally present in the maleic acid solution.

Aside from the preferred proportions of maleic acid, hydrogen chloride and water as set out above, this invention can be practiced on reaction mixtures containing, for each mole of maleic acid originally present, 1 to 8 moles of water, and for each mole of water, 0.005 to 0.12 mole of hydrogen chloride, however, the more concentrated reaction mixtures, with respect to both maleic acid and hydrogen chloride, are generally more satisfactory than the relatively dilute reaction mixtures.

In the practice of this invention, it is preferred to pass gaseous chlorine into the maleic acid liquor containing maleic acid, water and hydrogen chloride catalyst in the indicated proportions during the isomerization reaction and while the temperature of the reaction mixture is maintained within the range of about 105° C. to 125° C. However, the temperature of the reaction mixture may be varied between 85° C. and 150° C. during the isomerization reaction and while the chlorine is being passed into the reaction mixture. A reaction mixture containing the maleic acid, water and hydrogen chloride in the preferred proportions will have a refluxing temperature at atmospheric pressure of the order of 110° C., and this is an ideal temperature for the isomerization of maleic acid to fumaric acid with hydrochloric acid as the catalyst and in the presence of chlorine according to this invention. Higher reaction mixture temperatures up to 150° C. may be employed and can be obtained by placing the reaction mixture under sufficient superatmospheric pressure to elevate the boiling point of the reaction mixture to these higher temperatures.

The following examples will illustrate the practice of this invention, however, it is not intended that the scope of this invention be limited solely to the conditions and proportions set out in these examples.

Example I

In this and the following example, the isomerization of the maleic acid was carried out with hydrochloric acid as the catalyst, but in the absence of free chlorine, and will serve to contrast the improved results obtained by the practice of my invention as illustrated in subsequent examples. 1300 grams of a crude maleic acid solution, representing a portion of the aqueous condensate from a dehydration step for the concentration and dehydration of maleic acid liquor in a commercial process for the manufacture of maleic anhydride by the catalytic oxidation of benzene, was used as a starting material. This aqueous condensate contained about 339 g. of maleic acid. This aqueous condensate was concentrated by distillation at atmospheric pressure until the concentration of maleic acid had reached approximately 63%. Thereafter this concentrated maleic acid solution was heated to its reflux temperature at atmospheric pressure, and while the reflux conditions were maintained, 108 g. of concentrated hydrochloric acid (36% hydrogen chloride) was slowly added to the refluxing maleic acid solution over a period of ten minutes, during which time fumaric acid crystals began to separate from the reaction mixture. Thereafter the isomerization reaction mixture was contained under the refluxing conditions for about two hours at which time the reaction mixture was cooled to room temperature and the fumaric acid crystals were separated from the reaction mixture by filtration, the separated crystals being washed with dilute hydrochloric acid and water and subsequently dried. The fumaric acid thus obtained was a brownish tan in color and was otherwise of poor quality.

Example II

The above example was repeated, however, the aqueous condensate containing the maleic acid was twice treated with activated charcoal after concentration. The recovered fumaric acid crystals were only slightly improved in color over the color of the fumaric acid crystals of Example I and a very low grade product.

Example III 1228.4 g. of a crude maleic acid solution obtained as a portion of the same aqueous condensate as used in Example I was again used as the source of the maleic acid. This maleic acid condensate contained 320 g. of maleic acid and was concentrated to about 63% maleic acid by distillation at atmospheric pressure. While this concentrated maleic acid liquor was maintained at a temperature of about 100° C. gaseous chlorine was passed into the liquor until the color of the liquid became a pale lemon yellow, but without any visible evidence that any fumaric acid had been formed. This liquor was then heated to reflux temperature at atmospheric pressure and while the passage of chlorine into the liquor was continued, 111 g. of 36% hydrochloric acid was slowly added over a period of about ten minutes, during which time crystalline fumaric acid began to appear in the reaction mixture. After the addition of the hydrochloric acid was completed, the slow passage of chlorine into the reaction mixture was continued while the reaction mixture was maintained under gentle reflux conditions for about two hours, after which time the chlorine flow was shut off, a total of 5.2 g. of chlorine having been passed into the reaction mixture, and the reaction mixture permitted to cool to room temperature. The crystalline fumaric acid was recovered by filtration, washed with dilute hydrochloric acid and water and then dried. The fumaric acid so produced was substantially white and of high quality and was recovered in a yield of about 92% based on the maleic acid contained in the aqueous condensate.

*Example IV*

1244 g. of a crude maleic acid solution obtained as the aqueous condensate from the dehydration of crude maleic acid liquors in the manufacture and refining of maleic anhydride and containing 372 g. of maleic acid was concentrated by distillation at atmospheric pressure to about 67% maleic acid by weight. During this concentration a slow stream of chlorine was kept passing into the maleic acid liquor and during which time there was no visible evidence of fumaric acid crystals being formed. While this concentrated liquor was maintained at refluxing temperature at atmospheric pressure and the flow of chlorine was continued into the refluxing liquor, 166 g. of 28% food grade muriatic acid was added to the refluxing liquor over a period of about 25 minutes. Thereafter the reaction mixture was maintained under refluxing conditions and the flow of chlorine continued for about an additional two hours and a quarter, during which time the quantity of fumaric acid crystals continuously increased until the reaction mixture was a dense slurry of crystals. Thereafter the cooled reaction mixture was filtered to recover the fumaric acid crystals which were washed with dilute hydrochloric acid and cold water. 331 g. of very white, higher quality fumaric acid was recovered representing a yield of 89%.

*Example V*

1210 grams of a crude maleic acid solution was obtained as a portion of the aqueous liquor from a maleic anhydride water absorber following the catalytic oxidation of benzene in a process for the manufacture of maleic anhydride. This portion of crude maleic acid solution contained 308 grams of maleic acid, and in addition, a relatively large amount of impurities, and was concentrated by distillation until the maleic acid solution contained about 60% maleic acid. This concentrated maleic acid liquor was heated to refluxing temperature at atmospheric pressure and the passage of chlorine into the boiling liquor was begun and continued while 107 grams of 36% hydrochloric acid was slowly added to the refluxing liquor. After the addition of the hydrochloric acid catalyst was completed, the reaction mixture was kept at reflux conditions for an additional 2½ hours, during all of which time the flow of chlorine into the reaction mixture was continued. Thereafter the reaction mixture was permitted to cool to room temperature, and the fumaric acid crystals separated by filtration, washed with both dilute hydrochloric acid and water and then dried. The fumaric acid was recovered in a yield of 90%, and had a light yellow coloration.

*Example VI*

Another 1210 gram portion of the same maleic acid liquor as used in Example V was obtained, and the identical procedure of Example V repeated, except that the passage of chlorine into the maleic acid liquor was begun and continued throughout the concentration step in addition to the isomerization step. The fumaric acid product thus obtained was substantially white in a yield of about 91%.

While in most cases, a good quality, substantially white fumaric acid can be obtained directly from crude maleic acid solutions by passing chlorine into the reaction mixture only during the isomerization or conversion step, in some cases it may be desirable to continuously pass chlorine into the crude maleic acid solution during both the concentration and isomerization steps to further improve the quality of the fumaric acid, as illustrated by the foregoing Examples V and VI. Where the crude maleic acid solutions are very impure, or where a pure snow-white fumaric acid product is desired, it may be desirable, as a step prior to the practice of the processes herein described, to pre-treat the crude maleic acid liquors according to a process described in my co-pending application, Serial Number 264,240, filed December 29, 1951, now U. S. Patent No. 2,704,296.

I claim:

1. In a process for the conversion of maleic acid to fumaric acid, the step comprising isomerizing maleic acid in an aqueous solution in the presence of free chlorine in addition to hydrochloric acid as the isomerization catalyst.

2. In a process for the conversion of maleic acid to fumaric acid, the step comprising passing chlorine into an aqueous solution of maleic acid during the isomerization of maleic acid to fumaric acid with hydrochloric acid as the isomerization catalyst.

3. In a process for converting maleic acid to fumaric acid, the step comprising heating an aqueous solution of maleic acid containing free chlorine and hydrochloric acid.

4. In a process for converting maleic acid to fumaric acid, the steps comprising heating an aqueous solution of maleic acid containing hydrochloric acid while passing chlorine into said aqueous solution.

5. A process of claim 4 wherein the aqueous solution of maleic acid is heated to temperatures within the range of 85 to 150° C.

6. A process of claim 4 wherein the aqueous solution of maleic acid is heated to temperatures within 105 to 125° C.

7. In a process for the conversion of maleic acid to fumaric acid, the steps comprising heating an aqueous solution of maleic acid to reflux temperatures, passing free chlorine into the refluxing maleic acid solution during the addition of hydrochloric acid isomerization catalyst, and continuing to heat the isomerization reaction mixture under reflux conditions while passing chlorine into the isomerization reaction mixture.

8. In a process for producing fumaric acid, the steps comprising preparing an initial reaction mixture containing for each mole of maleic acid originally present, 1 to 8 moles of water and for each mole of water 0.005 to 0.12 mole of hydrogen chloride, and carrying out the isomerization reaction while passing free chlorine into the reaction mixture.

9. In a process for producing fumaric acid, the steps comprising preparing an initial reaction mixture containing for each mole of maleic acid originally present, 2 to 6 moles of water and for each mole of water 0.05 to 0.08 mole of hydrogen chloride, and carrying out the isomerization reaction while passing chlorine into the reaction mixture.

10. In a process for producing fumaric acid by the catalytic isomerization of the maleic acid contained in a crude aqueous maleic acid liquor obtained from a process for the manufacture of maleic anhydride by the catalytic oxidation of benzene, the steps comprising concentrating said crude aqueous maleic acid liquor by distillation until the maleic acid liquor contains about 50 to 80% maleic acid, adding sufficient hydrochloric acid to provide a reaction mixture containing for each mole of maleic acid present 1 to 8 moles of water and for each mole of water 0.005 to 0.12 mole of hydrogen chloride, heating said reaction mixture to temperatures within the range of 85 to 150° C. to isomerize the maleic acid to fumaric acid while passing chlorine into the reaction mixture during the time the reaction mixture is at a temperature within the range of 85 to 150° C.

11. A process of claim 10 wherein chlorine is passed into the aqueous maleic acid liquor also during the concentration step.

12. In a process for producing fumaric acid by the catalytic isomerization of the maleic acid contained in a crude aqueous maleic acid liquor obtained from a process for the manufacture of maleic anhydride by the catalytic oxidation of benzene, the steps comprising concentrating said crude aqueous maleic acid liquor by distillation until the maleic acid liquor contains about 60 to 65% maleic acid, adding sufficient hydrochloric acid to provide a reaction mixture containing for each mole of maleic acid present 2 to 6 moles of water and for each mole of water 0.05 to 0.08 mole of hydrogen chloride, heating said reaction mixture to temperatures within the range of 105 to 125° C. to isomerize the maleic acid to fumaric acid while passing chlorine into the reaction mixture during the time the reaction mixture is at a temperature within the range of 105 to 125° C.

13. A process of claim 12 wherein chlorine is passed into the aqueous maleic acid liquor also during the concentration step.

14. In a process for producing fumaric acid by the catalytic isomerization of the maleic acid contained in an aqueous maleic acid liquor obtained from a process for the manufacture of maleic anhydride by the catalytic oxidation of benzene, the steps comprising passing chlorine into the maleic acid liquor while concentrating said liquor by distillation to about a 60 to 65% maleic acid content, heating said concentrated liquor to a temperature within the range of about 105 to 125° C., passing chlorine into said heated concentrated liquor while adding sufficient hydrochloric acid to form a reaction mixture containing for each mole of maleic acid present 2 to 6 moles of water and for each mole of water 0.05 to 0.08 mole of hydrogen chloride and continuing to pass chlorine into said reaction mixture while the temperature of the reaction mixture is maintained within the range of about 105 to 125° C. to effect the isomerization of the maleic acid to fumaric acid.

References Cited in the file of this patent

UNITED STATES PATENTS

| | | |
|---|---|---|
| 2,170,972 | Martin | Aug. 29, 1939 |
| 2,208,519 | Spence et al. | July 16, 1940 |
| 2,349,514 | Moyer | May 23, 1944 |
| 2,358,775 | Finch et al. | Sept. 26, 1944 |
| 2,365,631 | Faith | Dec. 19, 1944 |
| 2,393,352 | Winstrom | Jan. 22, 1946 |
| 2,494,049 | Levin | Jan. 10, 1950 |

OTHER REFERENCES

Michael et al.: Beilstein (Handbuch, 4th ed.), vol. II, page 619 (1920).

Wislicenus: Beilstein (Handbuch, 4th ed.), vol. II, page 738 (1920).

Anschutz: Beilstein (Handbuch, 4th ed.), vol. II, pp. 741–2 (1920).

Kuhn et al.: Ber. Deut. Chem., vol. 61 (1928), page 501.

Wachholtz: Chem. Abstracts, vol. 22 (1928), page 908.

Derbyshire et al.: Chem. Abstracts, vol. 44 (1950), page 1033.